US007794273B2

(12) United States Patent
Xu et al.

(10) Patent No.: US 7,794,273 B2
(45) Date of Patent: Sep. 14, 2010

(54) CABLE CONNECTOR ASSEMBLY WITH IMPROVED FASTENING DEVICE

(75) Inventors: Bin Xu, Kunshan (CN); Su-Feng Liu, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/313,244

(22) Filed: Nov. 17, 2008

(65) Prior Publication Data

US 2009/0130878 A1 May 21, 2009

(30) Foreign Application Priority Data

Nov. 16, 2007 (CN) .................... 2007 2 0042307 U

(51) Int. Cl.
*H01R 13/73* (2006.01)
*H02B 1/01* (2006.01)

(52) U.S. Cl. ....................... 439/555; 439/564; 439/497; 411/45

(58) Field of Classification Search ................. 439/552, 439/555, 564, 573, 575, 495, 497, 574, 567; 411/45
See application file for complete search history.

(56) References Cited

U.S. PATENT DOCUMENTS

| | | | | |
|---|---|---|---|---|
| 4,405,272 | A * | 9/1983 | Wollar | 411/41 |
| 5,568,675 | A * | 10/1996 | Asami et al. | 24/453 |
| 5,945,606 | A * | 8/1999 | Tokunaga et al. | 73/756 |
| 6,648,676 | B1 * | 11/2003 | Lee | 439/499 |
| 6,692,310 | B2 * | 2/2004 | Zaderej et al. | 439/701 |
| 6,733,335 | B2 * | 5/2004 | Wu | 439/570 |
| 6,832,931 | B1 * | 12/2004 | Wu | 439/499 |
| 6,976,869 | B1 * | 12/2005 | Wu | 439/499 |

* cited by examiner

*Primary Examiner*—Hae Moon Hyeon
(74) *Attorney, Agent, or Firm*—Wei Te Chung; Andrew C. Cheng; Ming Chieh Chang

(57) ABSTRACT

A cable connector assembly (100) comprises an insulative housing (1), a plurality of contacts (2) received in the housing (1), a plurality of wires (3) electrically connecting to the contacts (2) and a fastening device (7). The housing (1) defines at least a through hole (107) in a lateral side thereof. The fastening device (7) comprises a bolt (71) matching with a nut (72) received in the through hole (107), the nut (72) has an engaging portion (723) split into at least two deformable pieces (7230), and the bolt (71) is slidably received in the nut (72) to urge the deformable pieces (7230) splaying when the bolt is pushed in; a stopper is arranged between the bolt and the nut to prevent the bolt from sliding out of the nut.

15 Claims, 6 Drawing Sheets

CABLE CONNECTOR ASSEMBLY WITH IMPROVED FASTENING DEVICE

BACKGROUND OF THE INVENTION

1. Field of the Invention

The present invention generally relates to a cable connector assembly, and more particularly to a cable connector assembly with a fastening device incorporated therewith facilitating readily and secured interconnection with a mating connector.

2. Description of Related Art

Computers are widely used in the different fields today. Each computer has a hard disk drive (HDD) for storing data. When the computer work, a Central Processing Unit (CPU) thereof continuously accesses the hard disk drive to retrieve data from the hard disk or store data to the hard disk drive. For compatibility, the interfaces of the hard disk drive are standardized. There are many hard disk drive interface standards and the SCSI (Small Computer System Interface) families and ATA (Advanced Technology Attachment) families are the most famous in the last decade.

Serial Attached SCSI (SAS) is a successor to the parallel SCSI and is based on serial technology. Besides the advantage of higher speed signal transmission, another most significant advantage is that the SAS interface is compatible with serial ATA (SATA) hard disk drives. The SAS receptacle connector has generally the same configuration as the SATA receptacle connector except that the two cavities of the SATA receptacle connector are merged in a single, but larger one, and a third set of signal contacts are incorporated into a second side wall opposing a first side wall where two sets of contacts have already being assembled.

Generally, a SAS-type cable connector assembly comprises a connector compatible with the SAS Protocol and a cable coupled to the connector and a mother board inside of the computer. The connector is further mounted to a panel of a computer via a fastening device. Such as disclosed by CN Patent No. 2559123Y, in which a cable connector assembly has a connector and a pair of screws used for fastening the connector to the panel of a computer, however, the screws can easily get lost when they separated from the cable connector assembly, furthermore, a tool is need to handle the screws to fasten them to the panel, and this is inconvenient for users. Therefore, it is necessary to provide an improved fastening device to facilitate interlocking and unlocking.

BRIEF SUMMARY OF THE INVENTION

Accordingly, the object of the present invention is to provide a cable connector assembly having a plastic rivet, which can facilitate fixing to a panel and removing from it.

In order to achieve the above-mentioned object, a cable connector assembly in accordance with the present invention comprises an insulative housing, a plurality of contacts received in the housing, and a plurality of wires electrically connected to the contacts and a fastening device. The housing defines a base portion and a mating portion extending forwardly from the base portion, said base portion having at least a through hole in a lateral side thereof. The fastening device is mounted to the through holes and comprises a bolt matching with a nut received in the through hole, said nut has an engaging portion split into at least two deformable pieces, and the bolt is slidably received in the nut to urge the deformable piece splaying; wherein blocking means between the bolt and the nut prevent the bolt sliding out of the nut.

Other objects, advantages and novel features of the invention will become more apparent from the following detailed description of the present embodiment when taken in conjunction with the accompanying drawings.

DETAILED DESCRIPTION OF THE INVENTION

Figure 1:
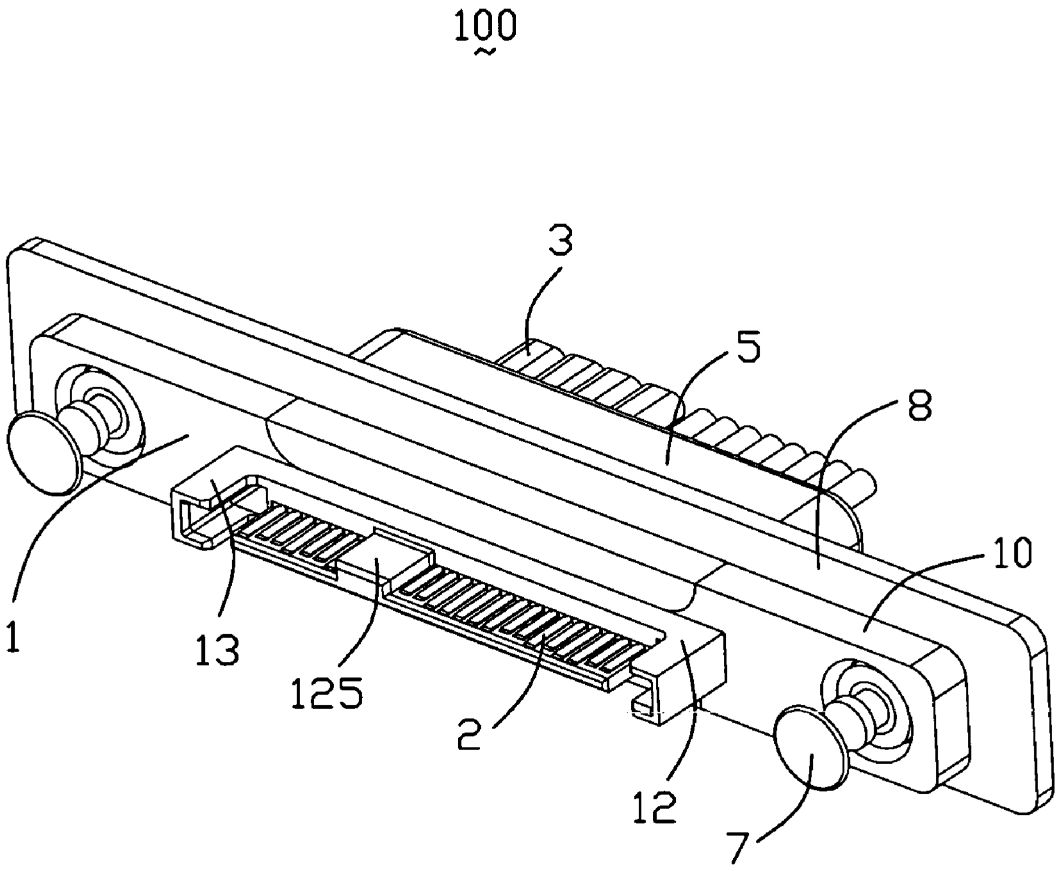
FIG. 1 is an assembled view of a cable connector assembly in accordance with the present invention.

Reference will now be made to the drawing figures to describe the present invention in detail.

Figure 2:
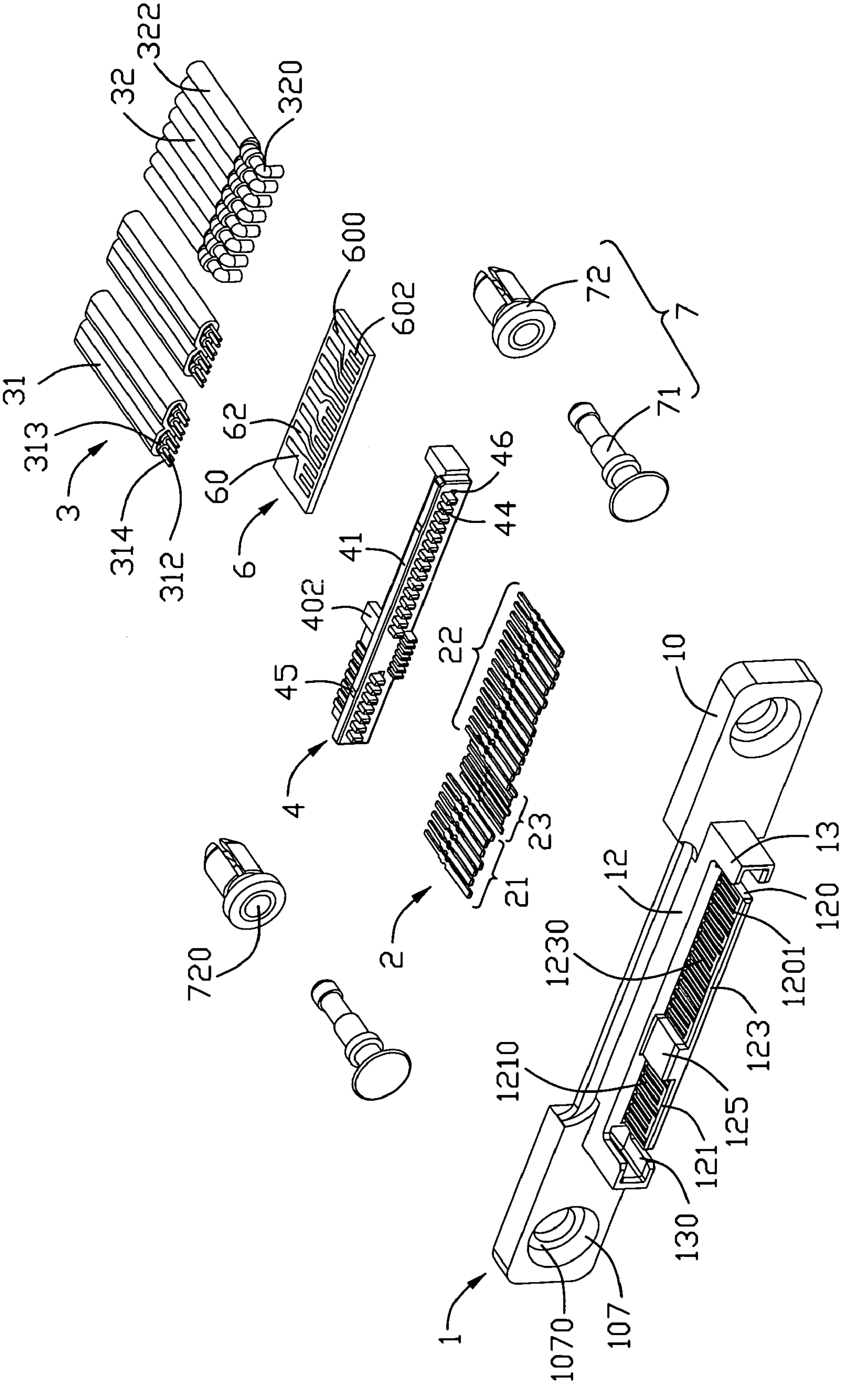
FIG. 2 is an exploded, perspective view of the cable connector assembly.
Figure 3:
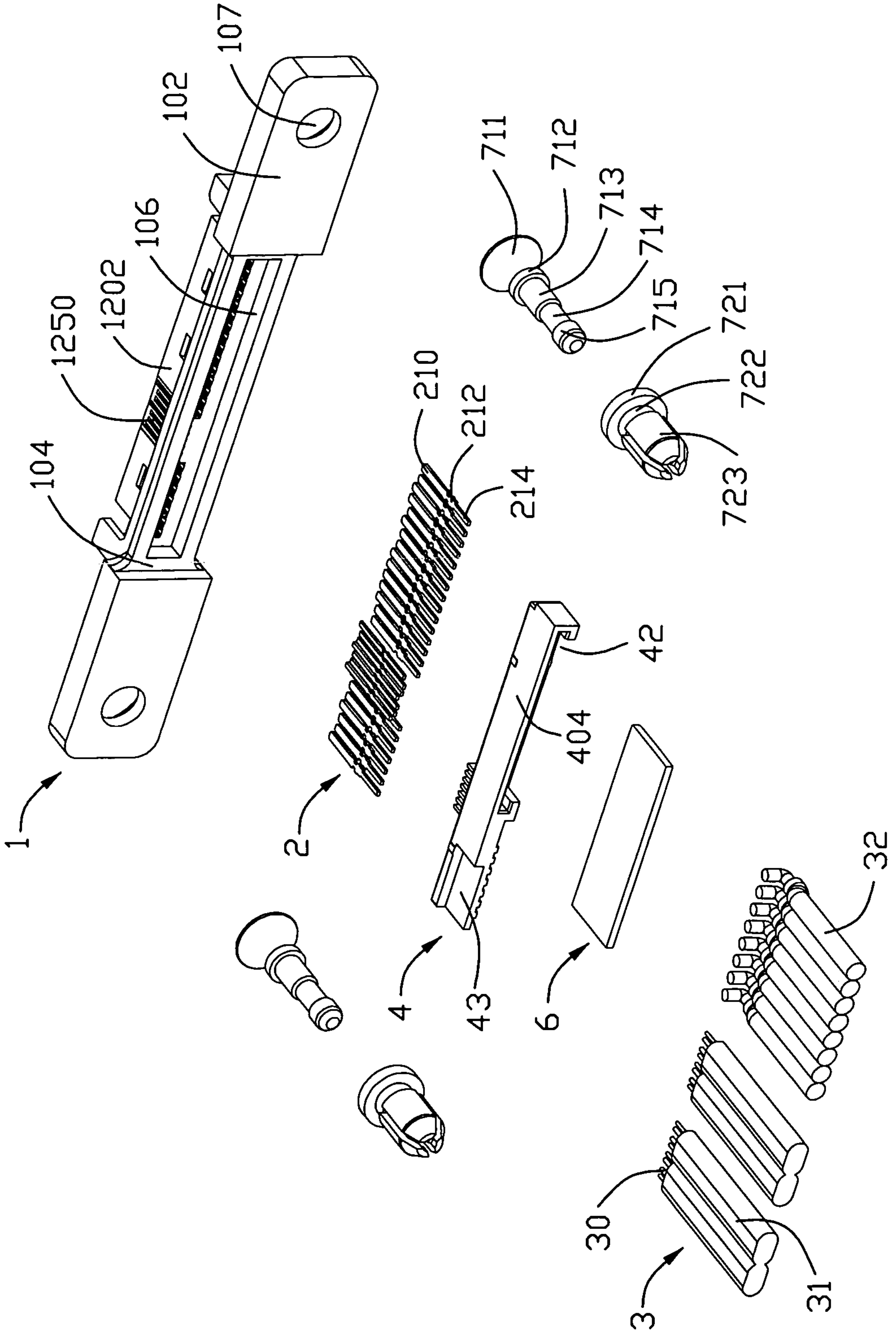
FIG. 3 is a view similar to FIG. 2, but viewed from a different angle.
Figure 4:
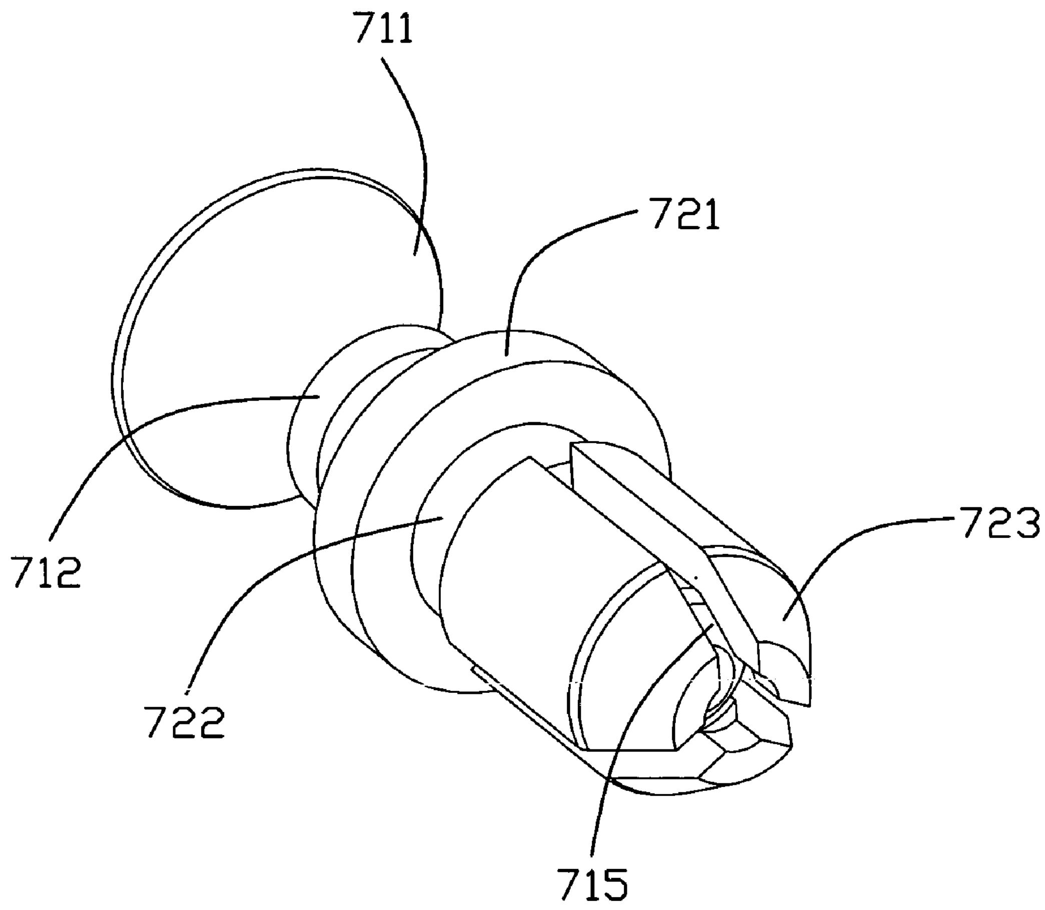
FIG. 4 is an assembled view of the fastening device.
Figure 5:
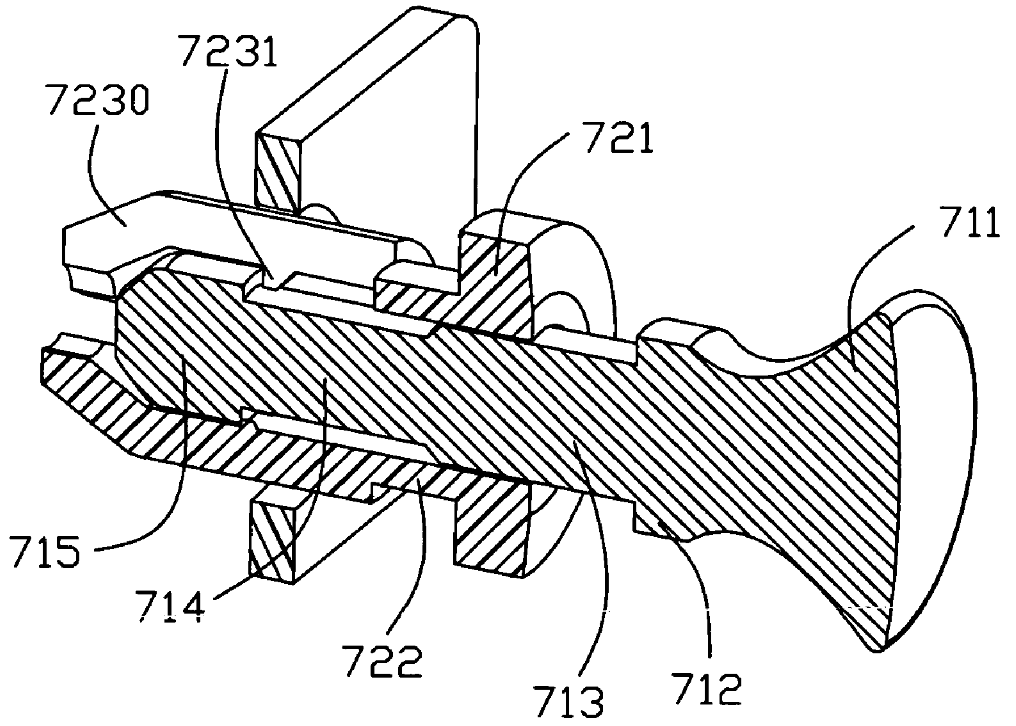
FIG. 5 is a cross-sectional view taken along line 5-5 of FIG. 4.
Figure 6:
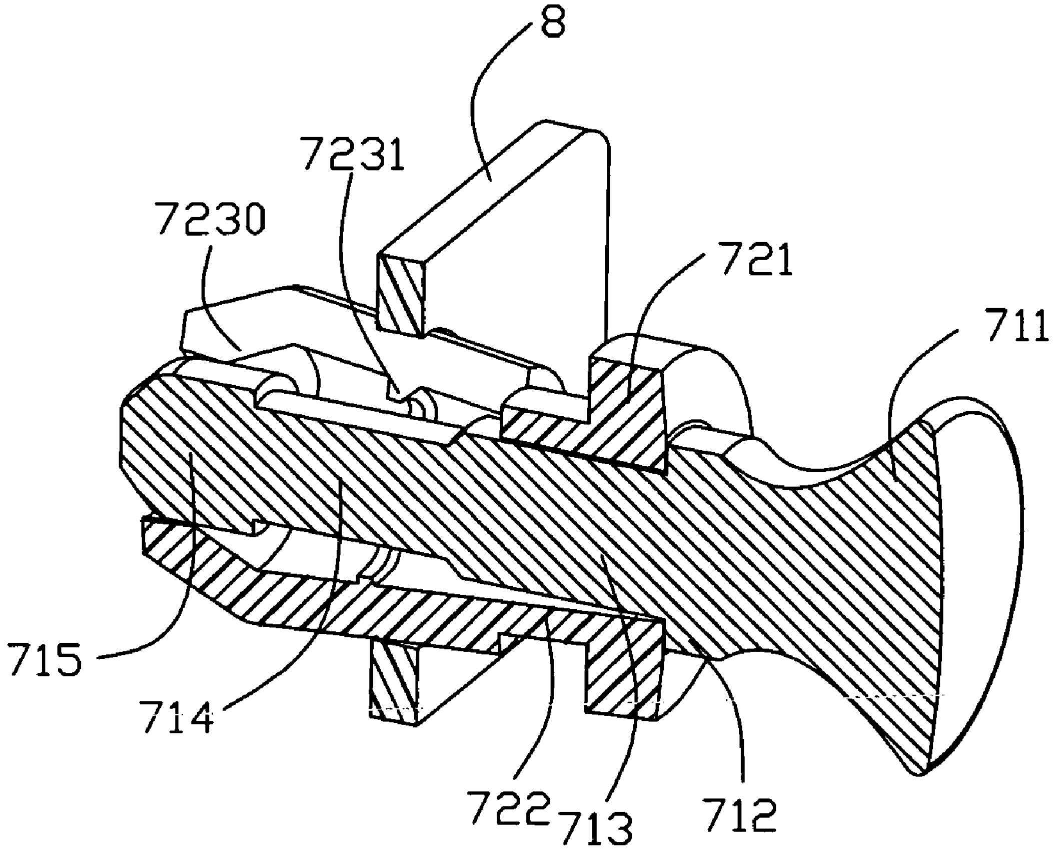
FIG. 6 is another cross-sectional view of the fastening device engaging with a panel.

Referring to FIGS. 1-3, a cable connector assembly 100 in accordance with the present invention comprises an insulative housing 1, a plurality of contacts 2 received in the housing 1, a plurality of wires 3 electrically connecting with the contacts 2, a spacer 4 attached to the housing 1, a printed circuit board 6 assembled to the spacer 4 and electrically connecting with both the contacts 2 and the wires 3, a cover 5 overmolded with the housing 1, tail portions of the contacts 2 and front portions of the wires 3, and a pair of fastening device 7 mounted in both sides of the housing 1.

The insulative housing 1 has an elongated base portion 10 and a mating portion 12 extending forwardly from the base portion 10. The base portion 10 defines a depression portion 104 recessed forwardly from a rear face 102 of a middle section of the insulative housing 1, and the depression portion 104 is opposite to the mating portion 12 along a mating direction. A rectangular aperture 106 is defined and located in the base portion 10 and in communication with the depression portion 104. The mating portion 12 has a tongue portion 120 in a middle section thereof, and which includes a first panel portion 121, a second panel portion 123 arranged in a side-by-side manner and extending along the mating direction. The tongue portion 120 further has an expanded portion 125 located between the first panel portion 121 and the second panel portion 123. An up surface 1201 of the first panel portion 121 and the second panel portion 123 and a bottom surface 1202 of the expanded portion 125 respectively have a plurality of first receiving passageways 1210, second receiving passageways 1230 and third receiving passageways 1250. The first receiving passageways 1210 and the second receiving passageways 1230 and the third receiving passageways 1250 are further slotted through the base portion 10 and communicate with the rectangular aperture 106.

A pair of guiding portions 13 extend forwardly from the lateral sides of the mating portion 12. Each guiding portion 13 has a guiding slot 130, facing to the tongue portion 120. Both sides of the base 10 define a through hole 107, and a front section of the through hole 107 is larger than a back section thereof, with a step 1070 formed therein.

The contacts 2 comprises a plurality of first contacts 21, a plurality of second contacts 22 and a plurality of third contacts 23, which are respectively received in the first receiving passageways 1210, the second receiving passageways 1230 and the third receiving passageways 1250. Each first contact 21 comprises a contact portion 210, a tail portion 214, and a retention portion 212 connecting the contact portion 210 and the tail portion 214. The configuration of the first contacts 21, the second contacts 22 and the third contacts 23 is same. The first contacts 21 are used for transmitting signal and the second contacts 22 are used for transmitting power. The number of the first contacts 21 is equal to that of the third contacts 23, and both of the first contacts 21 and the third contacts 23 respectively comprise three contacts for grounding and two pairs of contacts for data transmitting.

The second contacts 22 include three sets of contacts for transmitting power, and two sets of contacts for grounding located between the adjacent two sets of contacts for transmitting power. Each set of contacts for transmitting power is consisted of three contacts, which are together soldered to a power trace 60 of the printed circuit board 6. One set of contacts for grounding is soldered with corresponding grounding trace 62 of the printed circuit board 6 respectively, and the other set of contacts for grounding is consisted of three ground contacts, two of which are soldered to a common grounding trace 62 and the remaining one is soldered to a corresponding grounding trace 62.

Particularly referring to FIG. 1 and FIG. 2, the spacer 4 is elongated and comprises a first side 402 and a second side 404 opposite to the first side 402. A stop block 41 extends upwardly from the second side 404 and beyond the first side 402 along a direction perpendicular to the mating direction. A rectangular opening 42 is defined in the first side 402 and recessed from a lateral side of the rear face of the spacer 4. The second side 404 has a platform 43 disposed on opposite lateral side lower than an outer surface of the second side 404. The stop block 41 further defines a plurality of through holes 46 in communication to the first passageways 1210, the second passageways 1230 and the third passageways 1250. A pair of protrusions 45 are formed on both sides of the stop block 41. The spacer 4 further comprises a plurality of positioning ribs 44 extending forwardly from a front face thereof and are disposed above through holes 46.

The wires 3 comprise a plurality of first wires 31 in accordance with Serial ATA standard and a set of second wires 32 arranged abreast. The first wires 31 are separated into two groups, each group comprises two pairs of signal conductors 312 for transmitting signals, a pair of metal shieldings 313 enclosing the signal conductors 312 and two pair of grounding conductors 314 located at outer sides of the pair of signal conductors 312 and electrically connecting with the metal shielding 313. The signal conductors 312 and the grounding conductors 314 are soldered to corresponding tail portions 214 of the contacts 2, and the two grounding conductors 314 approached to each other are soldered to the same contact 2. The second wire 32 comprises a conductor 320 and an outer jacket 322.

The printed circuit board 6 has three sets of power traces 60 and two sets of grounding traces 62 located between the adjacent two sets of power traces 60. Each trace 60, 62 comprises a base portion 600 for electrically connecting with a corresponding wire 3 and at least one beam 602 connecting with the base portion 600 for electrically connecting with a corresponding contact 2. To be depicted in detail, each set of power trace 60 is configured to be fork shape, that is, the power trace 60 comprises three beams 602 connecting to a common base portion 600. One set of grounding traces 62 comprises a two-beam trace and a one-beam trace, while the other set of grounding traces 62 comprises three one-beam traces.

Referring to FIGS. 2-5, the fastening device 7 is made of plastic material, however, other materials such as metal is possible, and comprises a bolt 71 and a nut 72. The bolt 71 is consisted of an operating portion 711, a first block portion 712 extending rearwardly from the operating portion 711, a first post portion 713 extending rearwardly from the first block portion 712 and thinner than the first block portion 712, a second post portion 714 extending from the first post portion 713 to form a recess portion and thinner than the first post portion 713, and a nob 715 extending from the second post portion 714 and thicker than the second post portion 714, the nob 715 serves as a head portion of the bolt 71 and the diameter of the nob 715 is same as the first post portion 713.

The nut 72 has a receiving hole 720, and comprises a second block portion 721, a neck portion 722 extending rearwards from the second block portion 721, and an engaging portion 723 extending from the neck portion 722. The engaging portion 723 is split into three deformable pieces 7230 each with a horizontal main section extending along and a front inwardly tapered end section 7230. The receiving hole 720 extends along the nut 72 from front-to-rear. The diameter of the engaging portion 723 is thicker than the neck portion 722 but thinner than the second block portion 721. Three tabs 7231 are respectively formed on front sections of inner surfaces of the deformable pieces 7230 and extend into the receiving hole 720.

Referring to FIGS. 1-3, the first, the second and the third contacts 21, 22, 23 are respectively inserted into the through holes 46, and simultaneously received in the first, the second and the third passageways 1210, 1230, 1250, with the contact portions 210 thereof exposed on the up surface 1201 of the housing 1, the retention portions 212 thereof interferentially engaging with corresponding first, second and third passageways 1210, 1230, 1250, and the tail portions 214 thereof outside the rear face 102 of the housing 1. The spacer 4 is assembled to the rear end of the housing 1 with the printed circuit board 6 received in the opening 42 thereof. The positioning ribs 44 are respectively inserted into the back of the passageways 1210, 1230, 1250 for interconnecting the spacer 4 and the housing 1, the stop block 41 is received in the rectangular aperture 106 of the housing 1, with the protrusions 45 thereof interferentially engaging with interior side surfaces of the rectangular aperture 106.

To be depicted in detail, three tail portions 214 of each set of power contacts of the second contacts 22 are respectively soldered to three beams 602 of each power trace 60 of the printed circuit board 6, while the conductors 320 of the second wires 32 are respectively soldered to corresponding base portion 600 of power trace 60. The signal contacts of the first contacts 21 are respectively located on the first side 402 of the spacer 4 and respectively soldered with corresponding first wires 31.

The three sets of contacts for transmitting power and one set of contacts for grounding of the first contacts 22 are separated from adjacent contacts 22, so the possibility of mis-soldering is eliminated. Furthermore, the number of the beams 602 of the additional printed circuit board 6 is equal to that of the tail portions 214 of the second contacts 22, and the base portion 600 can be soldered with the conductors 320 of corresponding second wires 32 selectively.

Referring to FIG. 1, the cover 5 is of insulative material and molded over the base 10 of the housing 1 and molded over the solder connection between the contacts 2 and the wire 3, for protecting those components.

Referring to FIGS. 1-5, the fastening device 7 is assembled to the through holes 107, with the neck portion 722 of the nut 72 is fixed in the back section of the through hole 107, the second block portion 721 locates in the front section of the through hole 107, and the back face of the second block portion 721 is against the step 1070 of the housing 1. The bolt 71 inserts into the receiving hole 720, and the nob 715 reaches the back end of the tabs 7231, and locking with the tabs 7231, which may prevent the bolt 71 sliding out of the nut 72, as the size of the first post portion 713 is smaller than that of the receiving hole 720, so that the first post portion 713 can slide in the receiving hole 720 along an axial direction. Simultaneously, the nob 715 moves rearwardly and urges the deformable pieces 7230 of the engaging portion 723 splaying outwards along a radial direction, and to engage with corresponding mounting hole of a panel 8, so the cable connector assembly 100 is fixed to the panel 8 or other equipment. When it arrives to a certain position, the block portion 712 will be stopped by the second block portion 721. While separate the cable connector assembly 100 from the panel 8 or other equipment, operator may exert a forward force to the operating portion 711, the nob 715 moves forwardly to slide out of the engaging portion 723, and the engaging portion 723 restores, thus, the cable connector assembly 100 releases from the panel 8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly, comprising:

an insulative housing defining a base portion and a mating portion extending forwardly from the base portion, said base portion having at least a through hole in a lateral side thereof, said mating portion having a tongue portion and a pair of guiding portion arranged lateral sides of the mating portion, said tongue portion including a first panel portion and a second panel portion arranged in a side-by-side manner and extending along a mating direction, the tongue portion further having an expanded portion located between the first panel portion and the second panel portion;

a plurality of contacts received in the housing, said first and second panel portion respectively having a plurality of first and second receiving passageways receiving the contacts;

a plurality of wires electrically connected to the contacts;

a spacer having a stop block and a plurality of positioning ribs extending forwardly from a front face thereof, said stop block defining a plurality of through holes communicated with the first and the second passageways, said positioning ribs disposed above corresponding through holes; and a fastening device incorporated in the through holes, said fastening device comprising a bolt matching with a nut received in the through hole, said nut having an engaging portion split into at least two deformable pieces, and the bolt slidably received in the nut to urge the deformable piece splaying when the bolt is pushed in;

wherein blocking means are arranged between the bolt and the nut to prevent the bolt sliding out of the nut.

2. The cable connector assembly as claimed in claim 1, wherein the deformable pieces splay outwardly in proportional to the inward movement of the bolt.

3. The cable connector assembly as claimed in claim 1, wherein the nut further comprises a neck portion connecting the engaging portion and a block portion longitudinally.

4. The cable connector assembly as claimed in claim 3, wherein the neck portion of the nut is fixed in the back section of the through hole, the block portion locates in the front section of the through hole.

5. The cable connector assembly as claimed in claim 1, wherein the bolt includes an operating portion, a first block portion extending rearwardly from the operating portion, a first post portion extending rearwardly from the first block portion and thinner than the first block portion, and a second post portion extending from the first post portion and thinner than the first post portion, a nob extends from the second post portion and has the same diameter as the first post portion.

6. The cable connector assembly as claimed in claim 5, wherein the deformable pieces has at least one tab formed on a front section of an inner surface thereof.

7. The cable connector assembly as claimed in claim 6, wherein the nob latches with the tab.

8. The cable connector assembly as claimed in claim 1, wherein the through hole in the base portion has a front section and a back section smaller than the front section thereof, with a step formed therein.

9. The cable connector assembly of claim 1, wherein each of the guiding portions respectively defines a guiding slot facing to the tongue portion.

10. The cable connector assembly of claim 1, wherein the positioning ribs are inserted into the back of the first and the second passageways.

11. A cable connector assembly, comprising:

a housing with a plurality of contacts received therein;

a plurality of wires coupled to the contacts;

a pair of fastening devices mounted to lateral sides of the housing, each fastening device including a nut and a bolt, the nut retained in the housing, with a deflectable engaging portion thereof disposed out of the housing for inserting into a mounting hole of a panel, the bolt having a head portion moveable in the nut along an axial direction to urge the engaging portion to be expanded outward along a radially for jamming the mounting hole of the panel so as to fasten the housing to the panel;

wherein a stopper is formed on an inner surface of the nut and slidable with a distance along said axial direction in a recess portion adjacent to the head portion when the bolt is inserted further into the nut to outwardly expand the engaging portion; and wherein the stopper is latched with the head portion, for preventing the bolt escaping from the nut, before said engaging portion is urged by said bolt to be outwardly expanded.

12. An electrical connector assembly comprising:

a panel defining opposite front and rear faces, and a central main slot and a pair of first through holes by two sides of the central main slot, all of said main slot and said pair of first through holes extending through said panel in a front-to-back direction;

an electrical connector including an insulative housing defining a main base, which is seated upon the front face of the panel, with a mating portion extending forwardly therefrom;

a pair of second through holes formed in the base by two sides of the mating portion;

a pair of radially expansible hollow nuts each having a front opening to have an interior cavity communicating with an exterior, each of said nuts extending rearwardly through the second through hole and the corresponding first hole from an exterior face of the base; and a pair of bolts each extending rearwardly into an interior of the corresponding hollow nut from said front opening to expand a tail portion of the said hollow nut to engage a back of the panel around the corresponding first though hole; wherein a head portion is formed at a front end of the bolt, and the nut defines a plurality of deformable pieces each with a horizontal main section extending along and a front inwardly tapered end section and a tab formed on an inner surface of the horizontal main section behind the front inwardly tapered section to compliantly sandwich said head portion therebetween so as to have the hollow nut and the bolt engaged with each other to retain the bolt in the hollow nut without axial movement when said hollow nut is not engaged with the panel in a free status under condition that the nut essentially extends through the corresponding first through hole in a free status; wherein when said bolt is further inserted into the nut along the front-to-back direction, the horizontal main section of the nut is forcibly outwardly expanded in an outwardly tapered manner to be interferingly engaged within the corresponding first through hole for retaining the connector to the panel.

13. The electrical connector assembly as claimed in claim 12, wherein said hollow nut is not expanded before mounted to the panel while still retaining the corresponding bolt therein.

14. The electrical connector assembly as claimed in claim 12, wherein a spacer is assembled to a rear face of the housing essentially in alignment with the mating portion in said front-to-back direction.

15. The electrical connector assembly as claimed in claim 14, wherein a plurality of cables are connected to the connector behind the spacer.

* * * * *